United States Patent [19]

Fukuyama et al.

[11] 4,306,147
[45] Dec. 15, 1981

[54] REFLECTION-TYPE PHOTOELECTRIC SWITCHING APPARATUS

[75] Inventors: Toshifumi Fukuyama, Kyoto; Hideaki Hattan, Muko, both of Japan

[73] Assignee: Omron Tateisi Electronics Co., Kyoto, Japan

[21] Appl. No.: 108,710

[22] Filed: Dec. 31, 1979

[30] Foreign Application Priority Data

Feb. 13, 1979 [JP] Japan .................. 54/15282

[51] Int. Cl.³ .............................................. G01V 9/04
[52] U.S. Cl. ................ 250/221; 250/237 R; 250/239
[58] Field of Search ............... 250/221, 222, 239, 216, 250/237 R, 237 G; 356/141, 152; 340/555, 556

[56] References Cited

U.S. PATENT DOCUMENTS 3,002,420 10/1961 Willits et al.
3,578,978 5/1971 Laurent .............................. 250/221
3,697,762 10/1972 Kurtz.
4,207,464 6/1980 Fukuyama et al. .................. 250/239

*Primary Examiner*—David C. Nelms
*Attorney, Agent, or Firm*—Wegner & Bretschneider

[57] ABSTRACT

Reflection-type photoelectric switching apparatus comprising a housing having a transparent front window, a light projecting device, a light receiving device arranged in side-by-side relation with the light projecting device, the light projecting and receiving devices enclosed in the housing and in a predetermined space between the devices and the front window, an optically opaque screen having a pair of transparent portions corresponding to said light projecting and receiving devices, said screen being slidably disposed in said predetermined space, an adjusting mechanism controllable from outside of the housing for driving said screen to continuously adjust an effective area of said pair of transparent portions thereof, so that a detection field defined by a common zone, in which the projected and reflected light ray bundles are crossed, is continuously variable with said adjusting mechanism.

3 Claims, 4 Drawing Figures

REFLECTION-TYPE PHOTOELECTRIC SWITCHING APPARATUS

BRIEF SUMMARY OF THE INVENTION

The present invention relates to a reflection-type photoelectric switching apparatus comprising a light-projecting device which projects a beam of light to an object and a light-receiving device which receives a reflected light from said object to detect the presence of the object, and more particularly to a reflection-type photoelectric switching apparatus the detection field of which is variable.

The conventional photoelectric switching apparatus is essentially such that the axes of projected and reflected lights are nearly parallel with each other and the detection field is unfavorably wide and deep. Such apparatus has the disadvantage that when anything other than the object to be detected exists immediately behind the latter, the apparatus detects that thing, too. Particularly when such an adjacent thing or object has the same reflection factor as that of the object to be detected, the prior art apparatus cannot selectively detect the latter object alone, for the detection with such apparatus depends on differences in reflection factor among objects. In order to eliminate such disadvantage, there has been proposed a photoelectric switching apparatus which is adapted to detect the object existing within a predetermined distance from the apparatus, the detection field of the apparatus being variable. The conventional switching apparatus comprises a housing which encloses a light projecting device and a light receiving device fixed in side-by-side relation and at an angle, and an opaque cover having a transparent slit portion which, in front of the light projecting and receiving devices, is adapted to be removably mounted on a front surface of the housing, so that in correspondence with the shape of the transparent slit portion, a projected light ray bundle from the light projecting device and a reflected light ray bundle into the light receiving device are formed to provide a common zone as a detection field. The detection field, or the distance from the apparatus thereto, may be varied by replacing the cover with a different cover having a different size of transparent slit portion. The conventional apparatus, however, has the disadvantage that in order to allow the detection field of the apparatus to coincide with any desired range for intended application, a very large number of covers each having a distinct size of slit corresponding to each desired detection field have to be prepared, and it is troublesome to manually change the cover whenever the detection field is requested to be varied. By changing the sensitivity of the conventional apparatus, the detection field may be continuously varied to some extent without changing the cover, but it makes the sensitivity of detection unstable and dull.

It is, therefore, a primary object of the present invention to provide a reflection-type photoelectric switching apparatus in which a detection field capable of detecting an object can be easily and continuously varied with accuracy.

It is a further object of the present invention to provide a reflection-type photoelectric switching apparatus which is capable of detecting only the object in a predetermined detection field even if anything other than the object exists immediately behind or in front of the latter, irrespective of the reflection factor of such adjacent thing.

Other objects as well as the numerous advantages of the reflection-type photoelectric switching apparatus in accordance with the present invention will become apparent from the following detailed description and the accompanying drawings, in which:

DETAILED DESCRIPTION

Figure 1:
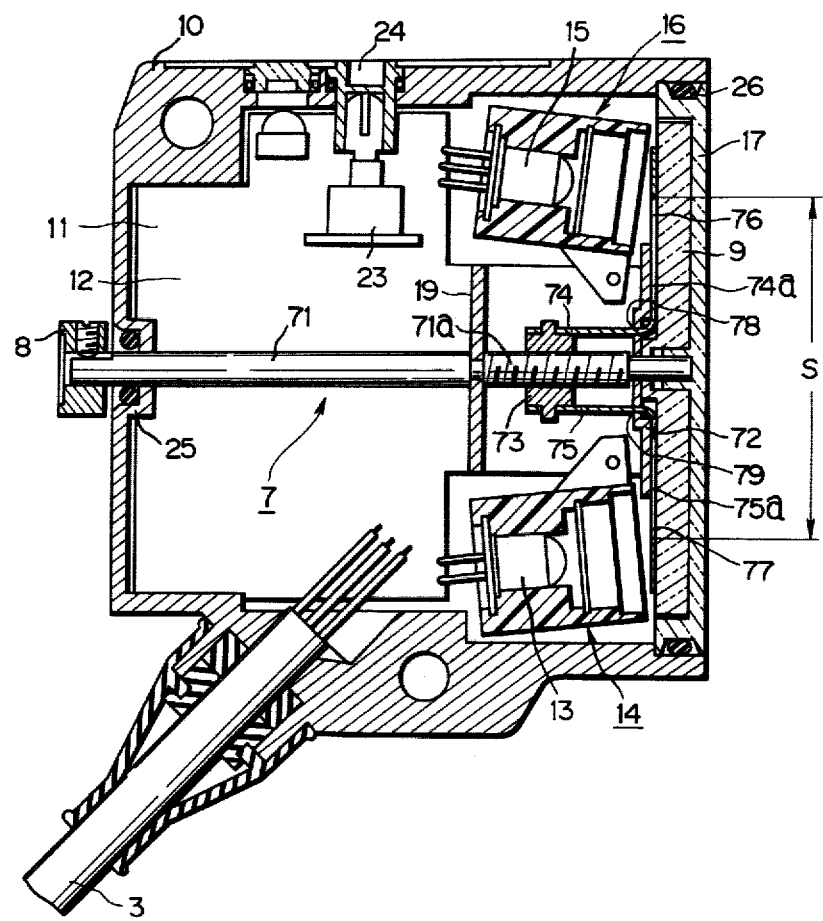
FIG. 1 is a sectional side elevational schematic view of a reflection-type photoelectric switching apparatus as a preferred embodiment of the present invention.

Referring, now, to FIG. 1, there is shown a reflection-type photoelectric switching apparatus, as one preferred embodiment of the present invention, which is enclosed by an optically opaque case or housing 10, a front opening of the case or housing 10 being fitted with an optically transparent window member 17 which is capable of transmitting projected and reflected light ray bundles. In a cavity 11 of the housing 10 are disposed a printed-circuit board 12 connected with a cable 3, a light projecting device 14, a light receiving device 16 and other associated members. Though not shown in the drawings the board 12 carries as mounted thereon a light projecting circuit which comprises an oscillation circuit and an amplification circuit, a light receiving circuit which comprises a detection circuit, an amplification circuit, and a switching circuit. A variable resistor 23 which is also mounted on the board 12 is adjustable from outside of the housing 10 via rotatable knob 24 built into the housing 10 so as to adjust the sensitivity of the switching apparatus. The light projecting and receiving devices 14 and 16 respectively have light projecting and receiving elements 13 and 15, which are fixed at a predetermined angle. In an inner wall of the window member 17, there is disposed a semi-cylindrical convex lens 9 for converging the projected and reflected light rays in a horizontal direction.

Figure 2:
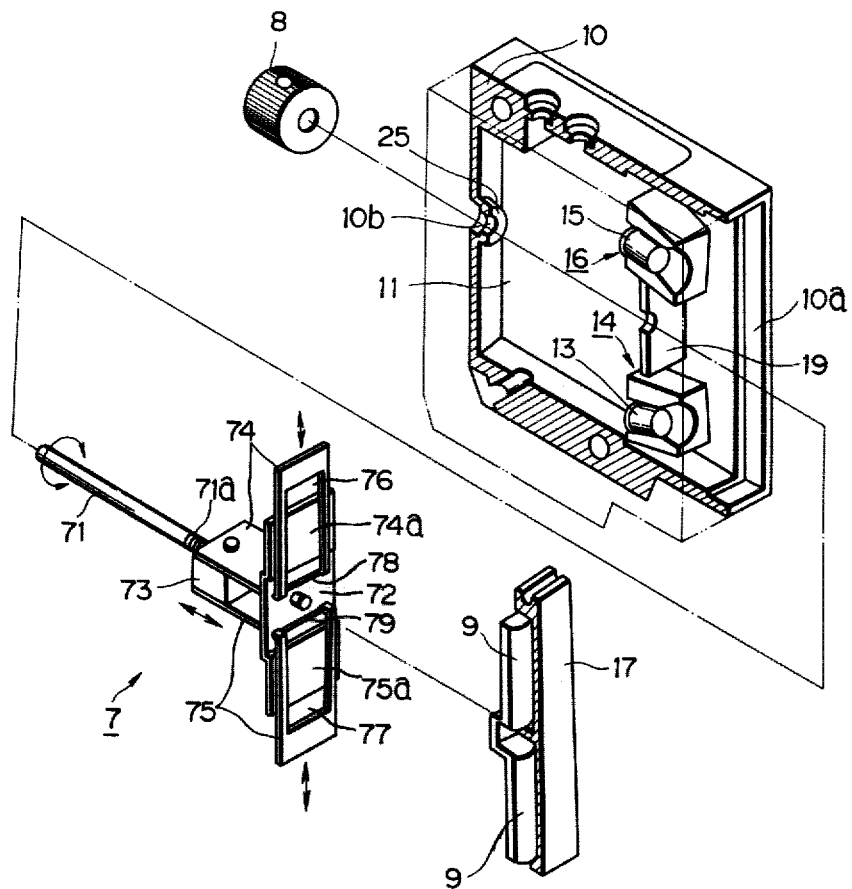
FIG. 2 is a perspective schematic view showing a portion of the apparatus of FIG. 1 before assembling.

A variable screen mechanism 7 is disposed in the cavity 11 of the housing 10 as also shown in FIG. 2, which consists of a pair of screens 74 and 75, and an adjusting device linked with the screens. The adjusting device includes a rotatable shaft 71 extending through the housing 10 and having a threaded portion 71a, and a movable nut 73 engaging the threaded portion 71a. To the nut 73 are fixed ends of the screens 74 and 75. The screens 74 and 75 are optically opaque flexible plates, made of sheet metal, plastic or the like material, and in the central portions thereof includes a pair of openings 74a and 75a, respectively. The screens 74 and 75 may be transparent films each having an opaque area as provided by mask-printing. The free ends of the screens 74 and 75 are extending through slits 78 and 79 formed in a stationary plate 72 coupled to the front end of the shaft 71. The openings 74a and 75a are each in the shape of a rectangle, but may be of any other suitable shape, e.g. a triangle, as desired.

When the variable screen mechanism 7 with other associated members including the window member 17 has been installed into the housing 10 through the front opening 10a thereof as shown in FIG. 2, the shaft 71 is rotatably supported by stationary members 19 and 25 of the housing 10 and the stationary plate 72 fitted with the housing 10, and extends through an opening 10b in the back wall of the housing 10. The projecting portion of the shaft 71 is fixed by a knob 8. When the knob 8 is manually rotated, the movable nut 73 engaging the shaft 71 moves forward or backward. As the nut 73 moves forward, the front portions of screens 74 and 75 slidably move between the lens 9 and the stationary plate 72, upwardly and downwardly, respectively. Conversely, as the nut 73 moves backward, the screens 74 and 75, respectively, move downwardly and upwardly.

The opening 75a of the screen 75 and a lower portion of the plate 72 provide a transparent slit 77 effective in defining a border of the projected light ray bundle from the projecting element 13. The opening 74a and an upper portion of the plate 72 provide a transparent slit 76 effective in defining a border of reflected light ray bundle incident on the receiving element 15. Accordingly, when the nut 73 moves forward, the maximum width S (shown in FIG. 1) between the slits 76 and 77 increases, and the projected and reflected light ray bundles are expanded. Conversely, when the nut 73 moves backward, the width S decreases and, accordingly, the projected and reflected light ray bundles are narrowed.

Figure 3:
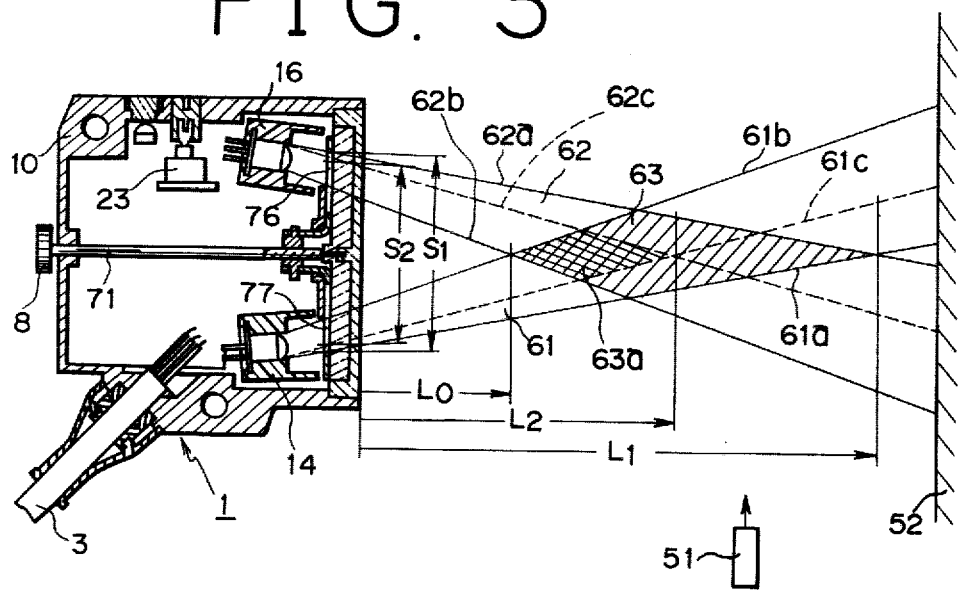
FIG. 3 is a sectional side view of the apparatus of FIG. 1 for illustrating the operation of the apparatus.

Referring to FIG. 3, there is shown a detection field 63 (shown in oblique lines) wherein the projected light ray bundle 61 through the slit 77 from the projecting device 14 and the reflected light ray bundle 62 through the slit 76 into the receiving device 16 are crossed. The vertical shape of the bundle 61 corresponds to the vertical length of slit 77, and the vertical profile of the bundle 62 corresponds to a vertical length of the slit 76. When, upon movement of the screens 74 and 75, the width S between slits 76 and 77 is decreased from $S_1$ to $S_2$, the projected light ray bundle 61 will exist in the area surrounded by lines 61b and 61c, the reflected light ray bundle 62 will exist in the area surrounded by lines 62b and 62c, and the detection field 63 will occupy a smaller area 63a (shown in hatched lines).

Figure 4:
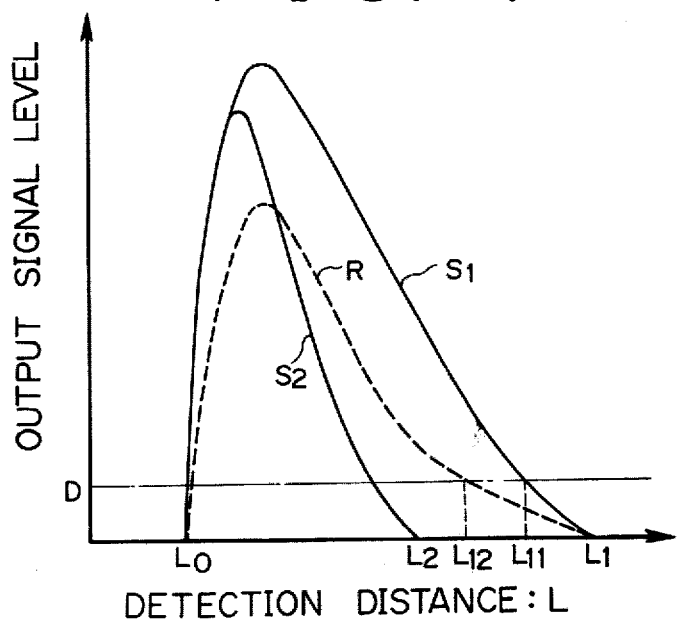
FIG. 4 is a graph showing the relation between the detection distance from the apparatus to an object and the level of output signal from the light receiving device in proportion to the detection distance in the case of the apparatus of FIG. 3.

Corresponding to the apparatus of FIG. 3, FIG. 4 shows the relation of the amplitude of output signal from the light-receiving device 16 vs. the detection distance L from the apparatus 1 to the object 51 present in front of the apparatus 1. The detection level D of FIG. 4 is predetermined and governs the actual detection field in which the apparatus 1 is able to actually detect the object 51. The curves $S_1$ and $S_2$ correspond to the widths $S_1$ and $S_2$ between slits 76 and 77, respectively.

When the width S is altered to $S_1$, anything not present within the field 63, e.g. a back wall 52, is not detected by the apparatus 1. This is true even if both the object 51 and the wall 52 have the same optical factor. Accordingly, upon manual revolution of the knob 8, the width S between the slits 76 and 77 is continuously varied, so that the detection field 63, viz. the longest detection distance from the apparatus 1, is continuously varied. The detection field may be varied to some extent by adjusting the detection sensitivity determined by the variable resistor 23. As shown in FIG. 4, for example, by lowering the sensitivity from curve $S_1$ to curve R, the maximum detection distance is varied from $L_{11}$ to $L_{12}$. However, the sensitivity curve R near the distance $L_{12}$ becomes obtuse, and this is unfavorable to the sensitivity of the apparatus.

In the present embodiment, the detection field may be easily and continuously varied with a simple operation of the knob 8 without interferring with the sharp sensitivity of the apparatus. The variation of the detection field does not require any special operation, so that the apparatus may be readily adapted to various, applications. The lower and upper portions of the stationary plate 72 determine the borderlines 61b and 62b, respectively. The lower and upper portions corresponding to the openings 75a and 74a of screens, however, may be cut out so as to be transparent to light, wherein the borderlines 61b and 62b are subject to the optical view angles of the devices 14 and 16.

As another embodiment of the present invention, the rotatable shaft 71 may be vertically positioned and have a gear portion which converts a rotary motion of the shaft into a rectilinear motion of the screens.

As still another embodiment of the present invention, the variable screen mechanism 7 may be such that screens are rigid plates and adapted to move forward or backward so as to respectively block optional portions of the projected and reflected light ray bundles. In a still other embodiment of the present invention, the variable screen mechanism 7 may be of the construction that the screens have openings so as to be able to change the angles of inner borderlines (61b and 62b) of the light ray bundles.

It should be understood that the above description is merely illustrative of the present invention and that many changes and modifications may be made by those skilled in the art without departing from the scope of the appended claims.

What is claimed:

1. Reflection-type photoelectric switching apparatus comprising
   a housing having a transparent front window,
   a light projecting device for projecting a light ray bundle to an object,
   a light receiving device arranged in side-by-side relation with said light projecting device for receiving a reflected light ray bundle from said object,
   said light projecting and receiving devices being enclosed in said housing and in a predetermined space between said devices and said front window,
   an optically opaque screen having a pair of transparent portions corresponding to said light projecting and receiving devices, said screen being slidably disposed in said predetermined space,
   an adjusting means controllable from outside of said housing for driving said screen to continuously adjust an effective area of said pair of transparent portions thereof, said effective area allowing said projected and reflected light ray bundles to pass therethrough, so that a detection field defined by a common zone, in which said projected and reflected light ray bundles are crossed, is continuously variable with said adjusting means.

2. Reflection-type photoelectric switching apparatus according to claim 1, wherein said opaque screen is a flexible plate, said adjusting means includes a rotatable shaft extending through a wall of said housing and a movable member engaging a threaded portion of said rotatable shaft, said flexible plate having a base portion engaging said movable member and a pair of free ends respectively having transparent portions corresponding to said light projecting and receiving devices.

3. Reflection-type photoelectric switching apparatus according to claim 2, wherein said movable member is a nut, said transparent portions are openings formed in said flexible plate, and said effective area is defined by said openings.

* * * * *